United States Patent [19]
Tchorzewski

[11] Patent Number: 4,922,538
[45] Date of Patent: May 1, 1990

[54] MULTI-USER SPEECH RECOGNITION SYSTEM

[75] Inventor: Kazimierz Tchorzewski, Ipswich, England

[73] Assignee: British Telecommunications public limited company, Great Britain

[21] Appl. No.: 152,924

[22] Filed: Feb. 5, 1988

[30] Foreign Application Priority Data

Feb. 10, 1987 [GB] United Kingdom ................ 8702910

[51] Int. Cl.⁵ .............................................. G10L 5/00
[52] U.S. Cl. ...................................... 381/42; 381/43; 381/41; 364/513.5
[58] Field of Search ..................... 381/51–53, 381/41–43; 364/513.5

[56] References Cited

U.S. PATENT DOCUMENTS 3,638,198  1/1972  Balough .
4,385,359  5/1983  Watari et al. .
4,641,342  2/1987  Watanabe et al. ................... 381/53

OTHER PUBLICATIONS

Nachrichtentechinsche Zeitschrift N.T. 2, vol. 37, No. 8, Aug. 1984, pp. 496–499, Berlin, DE; M. Immendorfer et al: "Sprachgenteuertes Telefon mit elecktronischem Telefonregisterspeicher" p. 498: Verschiedene Referenzmustersatze fur mehrere Benutzer.

Primary Examiner—Emanuel S. Kemeny
Attorney, Agent, or Firm—Nixon & Vanderhye

[57] ABSTRACT

A multi-user speech recognition system includes several speech recognizers which are shared between many user terminals. When a user terminal is activated, one of the recognizers is assigned to deal with voiced instructions received via that user terminal. This recognizer requests the respective "templates" from a memory device. A controller handles requests from the recognizers on a first-come first-served basis, and prevents later requests from interrupting earlier ones.

4 Claims, 3 Drawing Sheets

MULTI-USER SPEECH RECOGNITION SYSTEM

FIELD OF THE INVENTION

This invention relates to a speech recognition system capable of dealing with a plurality of users.

BACKGROUND OF THE INVENTION

Single-speaker dependent speech recognisers are known, for example for connection to a telephone, in which the user "trains" the recogniser with his or her voice patterns. These patterns are stored as "templates" in Random Access Memory (RAM) within the speech recogniser. When a user wishes to make a phone call, he activates the recogniser, for example by lifting the receiver, and the recogniser uses his templates to interpret voiced instructions, for example of the telephone number the user wishes to dial. When other users wish to use the speech recogniser, they have to go through the training procedure, and when this happens the original user's templates are deleted. Therefore, if the original user needs to use the speech recogniser again, he must retrain the recogniser first.

In multi-user environments, for example a Private Automatic Branch Exchange (PABX), one recogniser could be provided to serve all the extensions connected to the PABX. However, in this case, the user at every extension would probably have to go through the tedium of training the recogniser every time he wished to make a call.

An alternative arrangement would be to provide a speech recogniser at each extension, so that each will be trained only by that extension's user. However, such an arrangement would be prohibitively expensive.

A better alternative is to provide a few recognisers, connected to the PABX and shared between the many users. In such a system, a common database is provided containing the templates of all the users. When any particular user activates his extension, one of the quiescent recognisers is arbitrarily selected and assigned to his use, and his templates are then loaded into that recogniser. A micro-processor is provided to control the loading of the templates. The rate at which templates are loaded into the recognisers depends upon the speed of the micro-processor, and the more recognisers wanting access to the database there are, the more complex the micro-processor is required to be. Every recogniser is assigned a priority, and the micro-processor deals with requests for service in strict priority order; so if a lower priority recogniser has access and is loading templates, and a higher priority recogniser requests access, service to the lower device is suspended while the higher device is served. Only when the higher priority device has finished is the lower priority device allowed to continue. This type of interruption may continually occur, so that a low priority device may be delayed while several higher priority devices are served, and the overall system suffers from the disadvantage of not being totally user transparent.

SUMMARY OF THE INVENTION

According to the invention there is provided a speech recognition system comprising a plurality of user terminals connected to a plurality of speech recognisers, there being a smaller number of speech recognisers than there are user terminals, the speech recognisers being arranged such that, when a user terminal is activated, one of the recognisers is assigned to deal with voiced instructions input via that user terminal; a database containing respective templates for each of the user terminals, the database being arranged, in use, to send copies of templates corresponding to a particular user terminal, to a recogniser assigned to deal with instructions input via that user terminal; and control means connected to the speech recognisers and arranged in use, to control the transfer of copies of templates from the database to the recognisers; wherein the control means is arranged, in use, to receive requests for copies of templates from the recognisers, and to instruct the database to send complete copies of the requested templates in the order in which they are requested.

Advantageously, the control means comprises a cyclic channel selector and a clock, the cyclic channel selector and the clock being interconnected by a switch which is controlled by the requests for copies of templates from the recognisers.

BRIEF DESCRIPTION OF THE DRAWINGS

A preferred embodiment of the invention will now be described, by way of example, with reference to the accompanying drawings, in which:

FIG. 2b shows a realisation of the controller of FIG. 2a.

DETAILED DESCRIPTION

Figure 1:
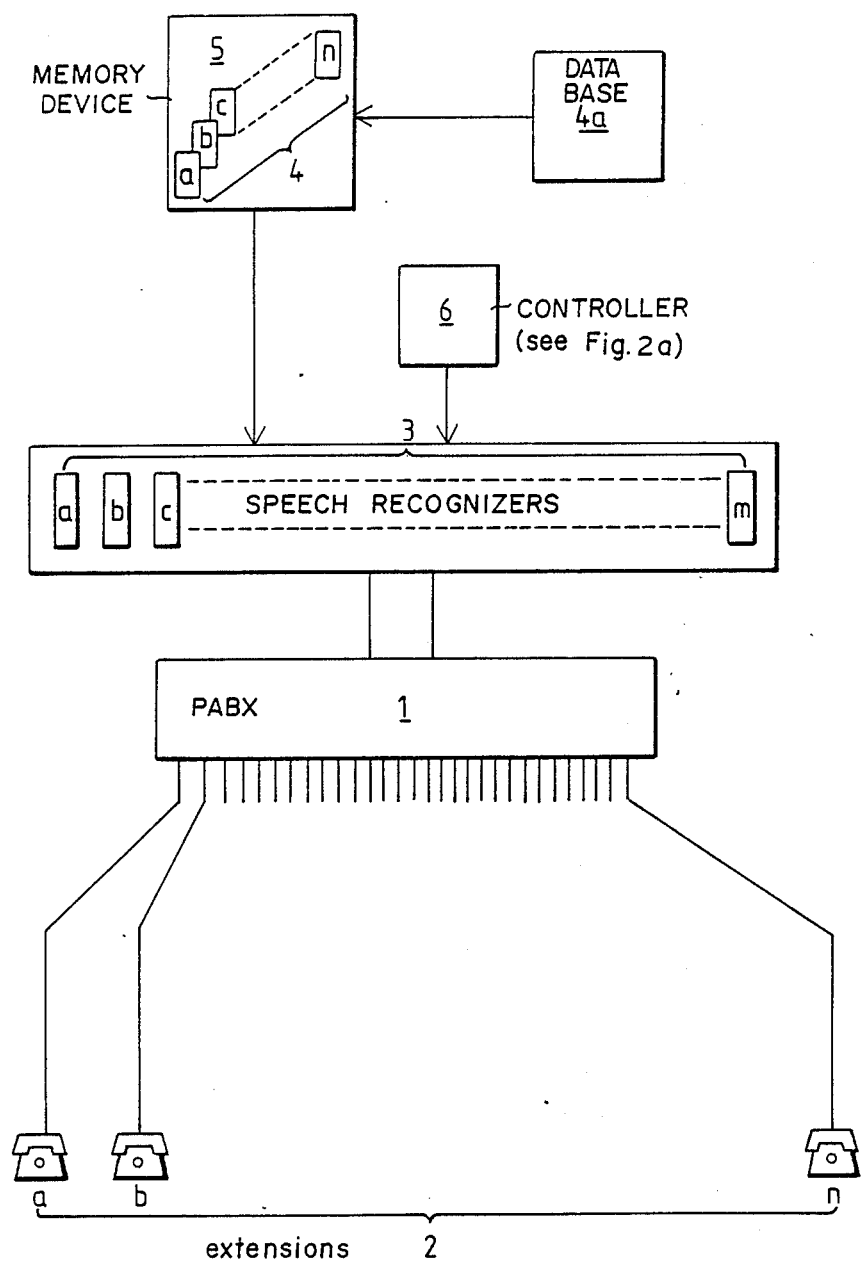
FIG. 1 shows a schematic illustration of a preferred embodiment of the invention.

Referring to the drawings, FIG. 1 shows a PABX 1 having n extensions 2 connected to a bank of m speech recognisers 3. The bank of speech recognisers 3 has access to a database 4a containing n sets of templates 4, one set corresponding to each extension 2, all stored in a memory device 5, for example a Winchester disk drive. A controller 6 is also connected to the bank of recognisers 3.

When one of the extensions 2 is activated, by a user picking up the receiver, one of the quiescent speech recognisers 3 in the bank is assigned to that extension. That recogniser 3 then ceases to be available for assignment to another extension 2. Once a speech recogniser 3 has been assigned, it requests the templates 4 associated with the relevant activated extension 2, and these templates are fetched from the memory device 5, and loaded into the recogniser. The user may then give voiced instructions to the recogniser 3 for handling the call.

Once no more instructions are expected from an extension 2, for example once a call has been set up, the recogniser 3 assigned to deal with that extension is returned to its quiescent state.

The requests from the recognisers 3 are handled by the controller 6 on a first-come first-served basis. The controller 6 assigns all the recognisers 3 equal priority, and all subsequent requests are stacked, in order of arrival, until previously-requested templates 4 have been loaded.

Figure 2A:
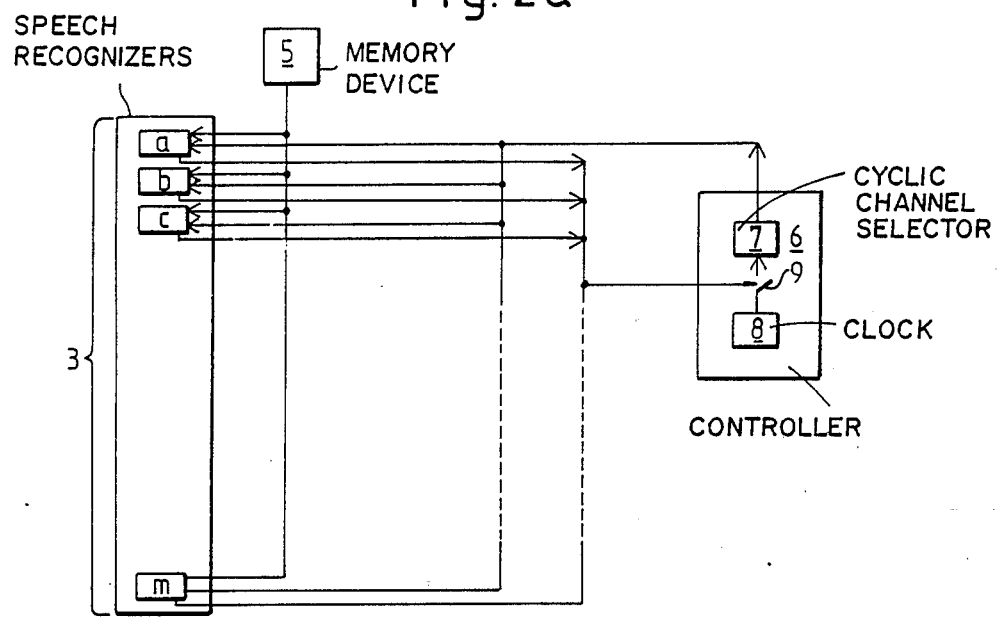
FIG. 2a shows a schematic illustration of a controller according to a preferred embodiment of the invention.

The controller 6, shown in more detail in FIG. 2a, comprises a cyclic channel selector 7 having a parallel output which is connected to all the recognisers 3 in the bank. The controller 6 also comprises a clock 8 having an output connected to the channel selector 7. Every clock pulse received by the selector 7 causes the parallel output to be incremented. Every recogniser 3 has an output, and these outputs are connected together to perform OR-logic, and thus to provide a control signal which stops the channel selector 7 from continuing to cycle. This is shown schematically as a control signal to a switch 9 which opens the circuit between the clock 8 and the selector 7.

Each recogniser 3 has a user-selectable channel identification number. When access to the memory device 5 is required, to load a set of templates 4, a given recogniser 3 scans the parallel output of the channel selector 7, and compares this with the identification number until there is a match. At this point, the recogniser 3 sends a high control signal, and freezes the selector's parallel output. The recogniser 3 then has complete uninterrupted access to the memory device 5. Once the templates 4 have been loaded into the recogniser 3, it ceases to send the high control signal, and the selector 7 continues to cycle unit it is again halted.

Figure 2B:
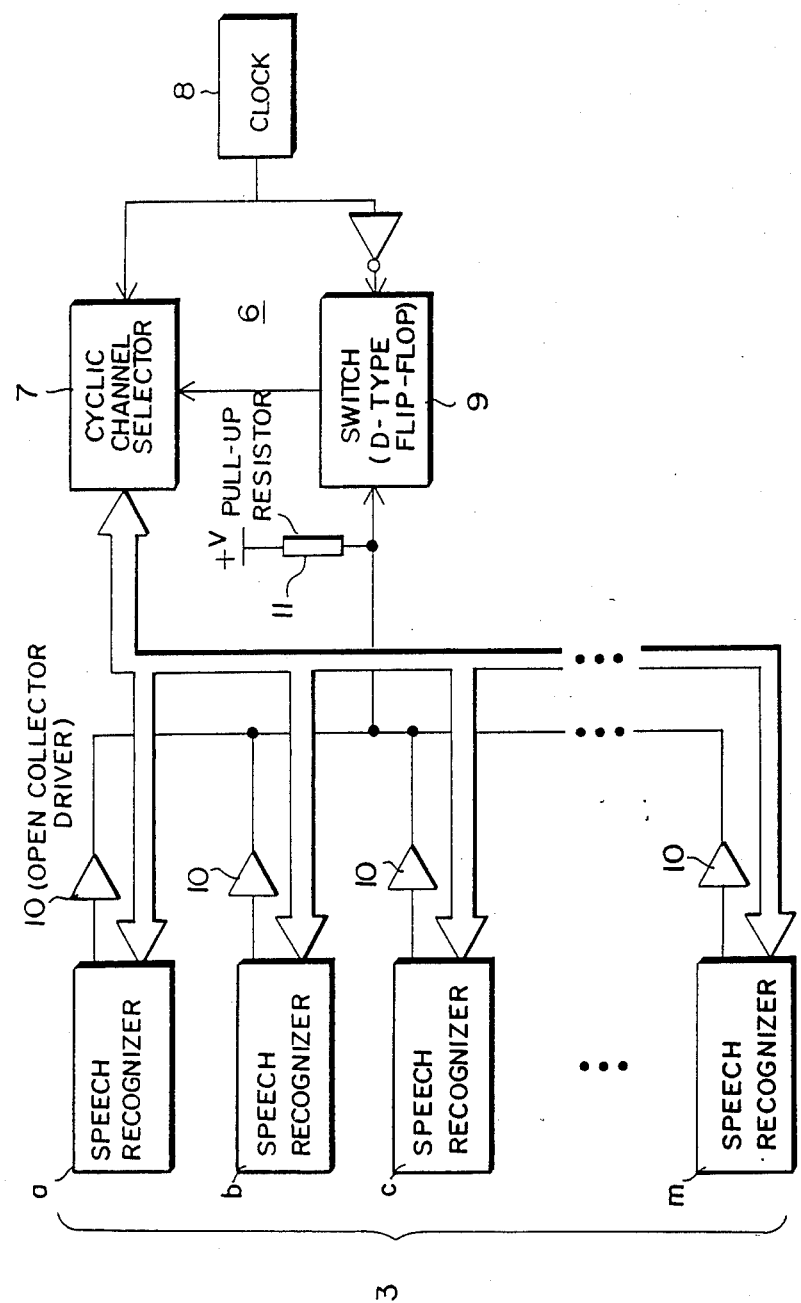

One of the advantages of this system is that the controller 6 does not require any intelligence, and may be realised with passive devices, as shown in FIG. 2b. In this realisation, open-collector drivers 10 are installed on the output lines of the recognisers 3, the lines all being connected together to perform OR logic; and the resulting single line, shown connected to a pull-up resistor 11, is fed to the switch 9, embodied by a D-type flip-flop.

Of course, the system may be arranged to operate when more than one user is expected to use any particular extension 2. In this case, each extension 2 may indicate to a recogniser 3 a series of users in a preferred order. The recogniser 3 will then request the templates 4 of the most preferred user, and check if these match the actual user. If not, the templates 4 of the second most preferred user may be requested, and so on.

It should be appreciated that the user terminals (extensions 2) and the recognisers 3 do not have to be wire-linked as shown in FIG. 1. The user terminals 2 could be portable transceivers, for example in a cellular radio system, connected to the recognisers 3 by radio channels. In this case, a PABX would be inappropriate, but any suitable type of switching node could be provided within box 1. In any event, the user terminals 2 would not necessarily be activated by lifting the receiver, but other means, for example a switch, could be used.

I claim:

1. A speech recognition system comprising:
    a plurality of user terminals connected to a plurality of single-speaker dependent speech recognisers, there being a smaller number of speech recognisers than there are user terminals,
    the speech recognisers being arranged such that, when a user terminal is activated, one of the recognisers is assigned to deal with voiced instructions input via that user terminal;
    a database containing respective single-speaker dependent templates for each of the user terminals, the database being arranged, in use, to send a copy of one of said templates corresponding to a particular user terminal to a recogniser assigned to deal with instructions input via that user terminal; and
    control means connected to the speech recognisers and arranged, in use, to control the transfer of copies of templates from the database to the recognisers;
    wherein the control means is arranged, in use, to receive a request for a copy of one of said templates from one of the recognisers, and to instruct the database to send a complete copy of the requested template without interruption by another such request from another terminal.

2. A speech recognition system as claimed in claim 1, wherein the control means comprises a cyclic channel selector and a clock, the cyclic channel selector and the clock being interconnected by a switch which is controlled by the requests for copies of templates from the recognisers to stop the cyclic channel selector for the duration of said transfer of a complete requested template.

3. In a multi-user single-speaker dependent speech recognition system having m speech recognition processors shared by a larger number of n users and having n corresponding speaker dependent speech recognition templates stored in a common data base shared by said m speech recognition processors, the improvement comprising:
    means for assigning particular ones of said m speech recognition processors to particular ones of said n users on a first-come first-served basis; and
    means for transferring a complete requesting user template to the correspondingly assigned speech recognition processor in response to said assignment and without interruption by any other requesting user.

4. An improved multi-user single-speaker dependent speech recognition system as in claim 3 wherein said means for assigning comprises means for cyclically addressing unassigned ones of said speech recognition processors to effect temporary connection to a common memory device containing said data base.

* * * * *